(12) United States Patent
Deiner et al.

(10) Patent No.: US 8,563,634 B2
(45) Date of Patent: Oct. 22, 2013

(54) INKJET INK INCLUDING POLYURETHANE

(75) Inventors: L. Jason Deiner, San Diego, CA (US); Yubai Bi, San Diego, CA (US); Gregg A. Lane, San Diego, CA (US); Sergiy Peleshanko, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/147,351

(22) PCT Filed: Jun. 8, 2009

(86) PCT No.: PCT/US2009/046550
§ 371 (c)(1),
(2), (4) Date: Aug. 1, 2011

(87) PCT Pub. No.: WO2010/090652
PCT Pub. Date: Aug. 12, 2010

(65) Prior Publication Data
US 2011/0288212 A1    Nov. 24, 2011

(30) Foreign Application Priority Data

Feb. 3, 2009   (WO) ................ PCT/US2009/032988

(51) Int. Cl.
*C08K 5/3445* (2006.01)
*C08K 5/17* (2006.01)
*C09D 11/02* (2006.01)

(52) U.S. Cl.
USPC ........... 524/106; 524/328; 524/507; 524/590; 523/160

(58) Field of Classification Search
USPC ....................................... 523/160
See application file for complete search history.

(56) References Cited

U.S. PATENT DOCUMENTS

| | | |
|---|---|---|
| 5,889,083 A | 3/1999 | Zhu |
| 5,973,062 A | 10/1999 | Harris et al. |
| 6,417,249 B1 | 7/2002 | Nguyen et al. |
| 6,814,437 B2 | 11/2004 | Wexler |
| 6,848,777 B2 | 2/2005 | Chen et al. |
| 6,908,185 B2 | 6/2005 | Chen et al. |
| 7,122,078 B2 | 10/2006 | Frese et al. |
| 7,176,248 B2 | 2/2007 | Valentini et al. |
| 7,348,368 B2 | 3/2008 | Kakiuchi et al. |

(Continued)

FOREIGN PATENT DOCUMENTS

| | | |
|---|---|---|
| CN | 1162322 A | 10/1997 |
| CN | 1494561 A | 5/2004 |

(Continued)

OTHER PUBLICATIONS

Machine translation of JP 2008-266595 to Itotani et al. (Nov. 6, 2008).*

(Continued)

*Primary Examiner* — Vu A Nguyen

(57) ABSTRACT

An inkjet ink composition includes: from 0.25 to 6 weight percent colorant; from 7 to 40 weight percent solvent; from 0.05 to 5 weight percent surfactant; and polyurethane binder in an amount of at least 0.5 weight percent of the inkjet ink composition but not more than twice the weight percent of the colorant. The polyurethane binder has a molecular weight from 32 K to 50 K and an acid number from 40 to 45. The polyurethane binder includes polyether polyol, aliphatic isocyanate and an acid group and does not include chain extenders.

17 Claims, 3 Drawing Sheets

(56) References Cited

U.S. PATENT DOCUMENTS

| | | |
|---|---|---|
| 7,435,765 B2 | 10/2008 | McCovick et al. |
| 2003/0078320 A1* | 4/2003 | Yatake .......................... 523/160 |
| 2003/0184629 A1 | 10/2003 | Valentini et al. |
| 2004/0085419 A1 | 5/2004 | Yau et al. |
| 2004/0092622 A1 | 5/2004 | Pearlstine et al. |
| 2004/0110867 A1 | 6/2004 | McCovick |
| 2004/0229976 A1 | 11/2004 | Kakiuchi et al. |
| 2006/0106132 A1 | 5/2006 | Ma et al. |
| 2006/0258773 A1 | 11/2006 | Schmid et al. |
| 2007/0225400 A1* | 9/2007 | Schmid et al. ................ 523/160 |
| 2007/0225401 A1* | 9/2007 | Sarkisian et al. ............. 523/160 |
| 2008/0207820 A1 | 8/2008 | Brust et al. |

FOREIGN PATENT DOCUMENTS

| | | |
|---|---|---|
| EP | 2341110 | 7/2011 |
| JP | 9241566 | 9/1997 |
| JP | 2008266595 | 11/2008 |
| WO | WO 2004/003090 A1 | 1/2004 |

OTHER PUBLICATIONS

International Search Report and Written Opinion for PCT/US2009/046550 dated Apr. 30, 2010 (13 pages).

Lonza Inc., Technical Data Sheet, "DANTOCOL® DHE," USAD-16840, www.lonza.com (2 pages).

PubChem Compound, "DEDM Hydantoin—Compound Summary," CID: 117879, PubChem Public Chemical Database, http://pubchem.ncbi.nlm.nih.gov /summary, printed Mar. 26, 2009 (2 pages).

Database WPI; Week 200879; Thomson Scientific, London, GB; AN 2008-N62911 XP002693992.

Supplementary European Search Report for Application No. 09839811.8 dated Apr. 2, 2013 (3 pages).

State Intellectual Property Office of People's Republic China for Application No. 200980156059.7.

\* cited by examiner ness good jettability. The ink composition includes a colorant present at about 0.25%-6% by weight, solvent(s) present at about 7-40% by weight, surfac-

INKJET INK INCLUDING POLYURETHANE

BACKGROUND

Durability failures in photo prints have many underlying causes, including adhesive failure of the ink layer to the media, cohesive failure within the ink layer, and compressive failure of the ink layer. There have been attempts to address these failures, such as, for example, by including different types of polymeric binders in the ink. In one attempt, the polymeric binder is one which is designed to work with self-dispersed pigments. This requirement of self-dispersed pigments may limit the design space of the inks, and also potentially increases the cost of the inks because it requires a very specific type of pigment surface functionalization. Another attempt allows a wider variety of pigment dispersion technologies to be used, but limits the range of the acid number of the binders in the ink to greater than 50. In both cases, jettability of the ink is potentially compromised by issues related to either high binder load or high acid number.

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

DETAILED DESCRIPTION

Figure 1:
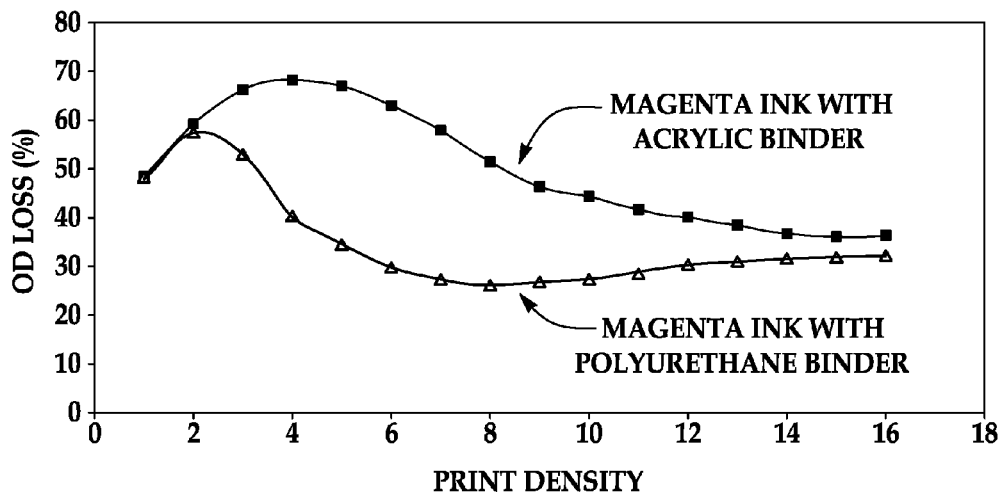
FIG. 1 is a graph plotting Optical Density (OD) loss (%) vs. Print Density for embodiments of two magenta inks respectively having therein an embodiment of the polyurethane binder disclosed herein and an acrylic binder.

The durability of a photo print is desirable, and in some instances necessary, for all markets—from the home consumer to the fine artist. However, one of the greatest potential weaknesses of photo prints made with pigmented inks is that they may be susceptible to scratching, scuffing, nicking, and burnishing. Therefore, in order for pigmented ink products to be competitive with other photo ink technologies (notably dye inks and silver halide), pigmented inks need to be formulated so that they can create high durability photo prints.

Embodiments of the compositions and methods disclosed herein advantageously are, or form, a polyurethane-containing inkjet ink composition that presents excellent scratch resistance while maintaining good jettability. The ink composition includes a colorant present at about 0.25%-6% by weight, solvent(s) present at about 7-40% by weight, surfactant(s) present at about 0.05-5% by weight, a specific polyurethane binder present at not more than 200% by weight of the weight percent of the colorant, and water. The ink may also include additional resin present at from 0.5% to 2% by weight. For example, acrylic resin may be used to disperse the pigment.

The polyurethane binder is formed of a polyether polyol, an aliphatic isocyanate, and an acid group. In one embodiment, the polyurethane binder is formed using polytetramethylene glycol and isophorone diisocyanate. The molecular weight of the polyurethane binder is between 40 K and 50 K, and its acid number is approximately 40-45 (acid number being defined as mg KOH neutralized by 1 g of the given composition). In another example, the molecular weight of the polyurethane binder ranges from 32,000 to 50,000. Unless otherwise stated, when a molecular weight of a composition is given in this specification, a number average molecular weight is intended. The polyurethane binder also does not include chain extenders (e.g., difunctional compounds such as hydroxylamines, glycols or diamines that are often used to influence the end properties of polyurethanes). In an embodiment, the polyurethane binder has a glass transition temperature ($T_g$) in a range from approximately 5° C. to approximately 50° C. In an example, the average $T_g$ is approximately 27° C. as measured by dynamic scanning calorimetry and with a heating rate of 20° C./minute.

In one embodiment, the solvent may be selected from 1,3-di(hydroxyethyl)-5,5-dimethylhydantoin, betaine, and combinations thereof. The 1,3-di(hydroxyethyl)-5,5-dimethylhydantoin is commercially available under the tradename DANTOCOL® DHE from Lonza Inc. in Allendale, N.J. Other synonymous names for this same compound include: diethylol dimethyl hydantoin; 2,4-imidazolidinedione, 1,3-bis(2-hydroxyethyl)-5,5-dimethyl-; and 1,3-bis(2-hydroxyethyl)-5,5-dimethylimidazolidine-2,4-dione.

One non-limiting example of a suitable colorant for use in the ink is an acrylic resin-dispersed pigment. It is to be understood that other resin-dispersed pigments may be used as well.

Some non-limiting examples of suitable surfactants include fluorosurfactants; polyethylene oxide alkyl ethers; polyethylene oxide alkyl esters; amine oxides; primary, secondary and/or tertiary amine salts; alkyne containing alcohols and/or glycols; and/or alkyl phenyl polyethylene oxides.

In an embodiment, the inkjet ink, as a non-limiting example, may be made by a method including the steps of: combining a di-acid with polytetramethylene glycol to produce a diol; combining the diol with isophorone diisocyanate to produce the polyurethane binder; and combining the polyurethane binder with solvent, colorant and surfactant to produce the inkjet ink. As mentioned hereinabove, the resulting inkjet ink includes from 0.25 to 6 weight percent of the colorant; from 7 to 40 weight percent of the solvent; and from 0.05 to 5 weight percent of the surfactant. The polyurethane binder is present in an amount of at least 0.5 weight percent of the inkjet ink, or at least 0.75 weight percent, but not more than twice the weight percent of the colorant.

The combination, as described in an embodiment above, of a specific polyurethane, a specific dispersion type, and a specific solvent minimizes both scratch resistance and decap performance.

More than 100 different polyurethane binders were tested along with a broad range of solvents. Overall, several hundred inks were screened. The embodiment disclosed herein represents the class of binders and solvents with the best performance out of the several hundred tested. When the scratch resistance of the embodiments disclosed herein was tested, it was found to show significant advantages and improvements over competitors' inks currently on the market. The ink composition disclosed herein exhibits durability and is readily jettable.

The specific polyurethane binder structure of the embodiments disclosed herein is used at a pH which is compatible with a range of pigment dispersion technologies, including polymerically dispersed pigments.

It will be understood by those skilled in the art that other known additives such as biocides, emulsifiers, humectants, and buffers may be added to the ink composition of the present disclosure to optimize the properties of the ink composition for specific applications.

When the embodiments of the ink are used in inkjet photo printing, the results are photos that are more durable and last longer than photos generated via at least some of the currently available inkjet photo printing technologies. Such an ink would be useful in the full range of photo markets, from simple kiosk prints to high end art photos.

To further illustrate embodiment(s) of the instant disclosure, various examples are given herein. It is to be understood that these examples are provided for illustrative purposes and are not to be construed as limiting the scope of the disclosed embodiment(s).

EXAMPLES

Example 1

A Differential Scanning calorimetry (DSC) analysis was performed for two different batches of the polyurethane binder described herein. Two samples of each batch were measured. Each sample went through two measuring cycles: initial heating and reheating. This was done to prevent residual solvents, and the thermal history of the samples, from affecting the results. The polyurethane was found to have two segments: a hard segment with a higher Tg and a soft segment with a lower Tg. DSC measured the average Tg between them. Glass transition temperatures were reported as 33° C. for the first batch and 21° C. for the second batch. As determined by DSC, the range limits of glass transition were well defined and the glass transition occurred from 5° C. to 50° C., these range limits representing where the heat absorption rate changes before and after polymer phase transition. The average Tg was calculated as approximately 27° C. ((33+21)/2=27) with a heating rate of 20° C./min and was based on the inflection point of the transition phase between the two range limits.

Example 2

An oscillating sand abrasion test (OSAT) was used to quantitatively compare scratch resistance in different ink formulations. The test was performed as follows. An optical density test plot was prepared having printed samples on the plot representing a 16 level density ramp of increasing printed ink optical densities.

At different density levels on the ramp, different mechanisms of durability failure come into play. Up until about density level 10, the ink film is not yet fully contiguous on the media. At the density level above level 10, the ink forms a continuous film and the film is more abrasion-resistant. Generally, an optical density loss above level 10 is due to the quick loss of gloss and the failure of ink film cohesion. In contrast, below density level 10, dot adhesion to the page is a significant durability factor.

It can be said that the most sensitive area of the graph in terms of density loss is between density level 4 and 10. In this range, the printing surface is nearly fully covered with dots. However, the film is not yet contiguous and discreet dots, or dot edges, are still present. For this reason, in the range of density level 4 to 10, dot adhesion to the paper surface and dot adhesion failure become more significant factors relative to other factors. However, from levels 4 to 10, gloss loss and cohesive failure can be influential factors as well.

At density levels of 3 and below, both adhesive and cohesive failure are still significant, but there are fewer dots on the paper so the initial density is very low. Therefore, at density levels of 3 and below, measurement error can be present. In light of these facts about the density ramp, it is advisable to pay particular attention to the density loss between density levels 4 and 10. However, to obtain an overall picture of durability, the testing of all 16 durability levels is desirable.

The optical density of each sample on the plot was measured before being submitted to OSAT. The plot was placed in a tray under a layer of sand. The tray was shaken for a given amount of time (~3 minutes) at a given rate (250 strokes per minute). The optical density of each sample on the plot was measured again, after each sample was scratched by the sand. The optical density loss % was computed. The steps were repeated for different ink test plots. Percent optical density loss was compared for the range of inks tested. Lower optical density loss % can be equated to greater scratch resistance.

The OSAT test was first of all performed to determine scratch resistance for two magenta inks having the same composition except that the first magenta ink included a polyurethane binder as described herein and the second ink included a conventional acrylic binder (Joncryl® 683). Each of the inks included approximately 1.5 weight % of their respective binders. As shown in FIG. 1, which is a graph plotting OD loss (%) vs. Print Density, scratch resistance improved by approximately 100% for the first ink which had the polyurethane binder in comparison to the second ink which had the acrylic binder. Other colors showed similar levels of improvement as described below.

Example 3

Figure 2:
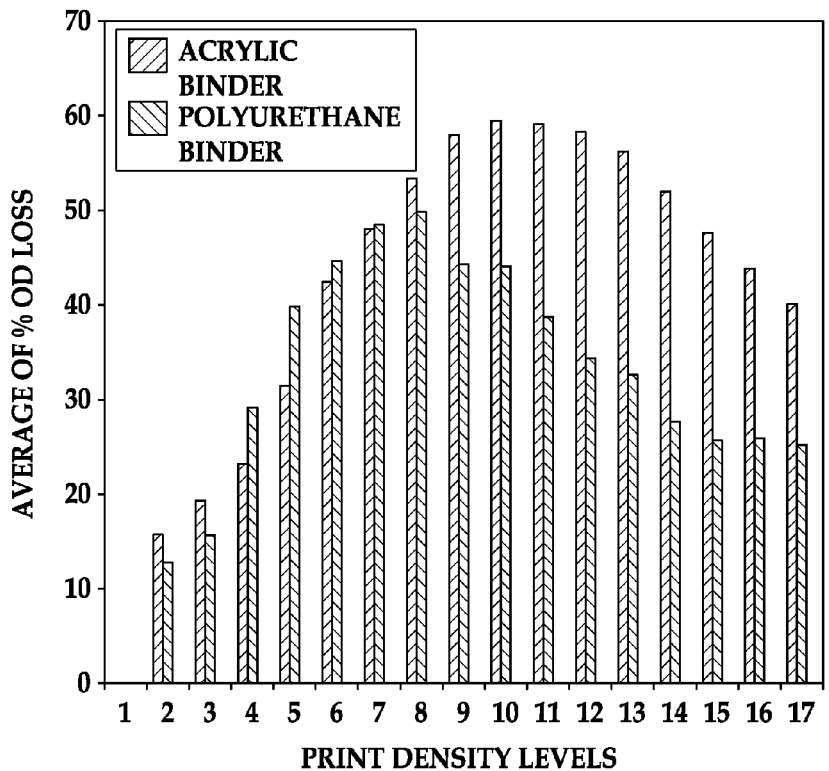
FIG. 2 is a bar graph which compares Optical Density loss of two cyan inks respectively having therein an embodiment of the polyurethane binder disclosed herein and an acrylic binder at sixteen levels of increasing print density.

Similar tests that were performed as described in Example 2 above were also performed with two cyan inks. The results are shown in the bar graph labeled FIG. 2, which compares the optical density loss of each of the two inks at sixteen levels of increasing print density. The first ink has the conventional acrylic binder described in Example 2. The second ink has the polyurethane binder disclosed herein. Each ink included approximately 1.5 weight % of its respective binder. The data consistently shows significantly less optical density loss for the ink with the polyurethane binder (the bar on the right for each print density level) as compared to the ink with the acrylic binder (the bar on the left for each print density level).

Example 4

Figure 3:
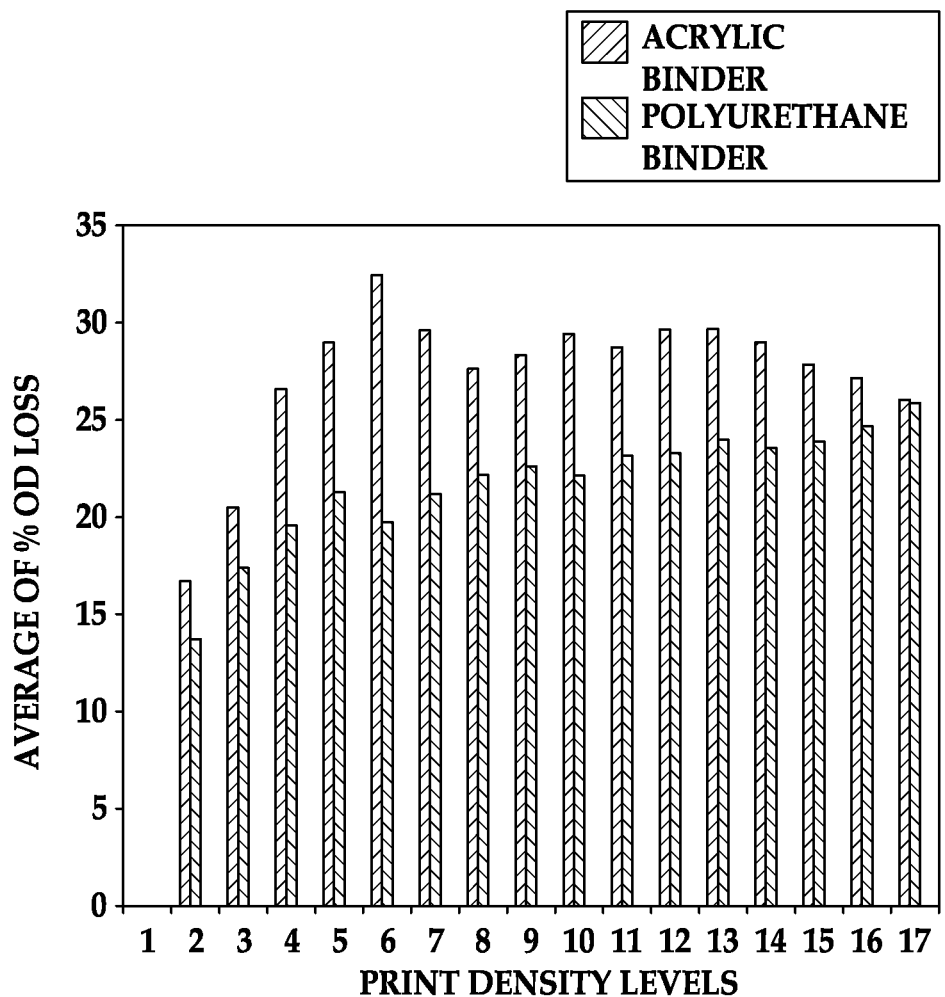
FIG. 3 is a bar graph which compares Optical Density loss of embodiments of two photo black inks respectively having therein an embodiment of the polyurethane binder disclosed herein and an acrylic binder at sixteen levels of increasing print density.

Similar tests that were performed as described in Example 2 above were also performed with two photo black inks. The results are shown in the bar graph labeled FIG. 3, which compares the optical density loss of each of the two inks at sixteen levels of increasing print density. The first ink has the conventional acrylic binder described hereinabove in Example 2. The second ink has the polyurethane binder described in the embodiments of the instant application. Each ink included approximately 1.5 weight % of its respective binder. The data consistently shows significantly less optical density loss for the ink with the polyurethane binder (the bar on the right for each print density level) as compared to the ink with the acrylic binder (the bar on the left for each print density level).

Example 5

Figure 4:
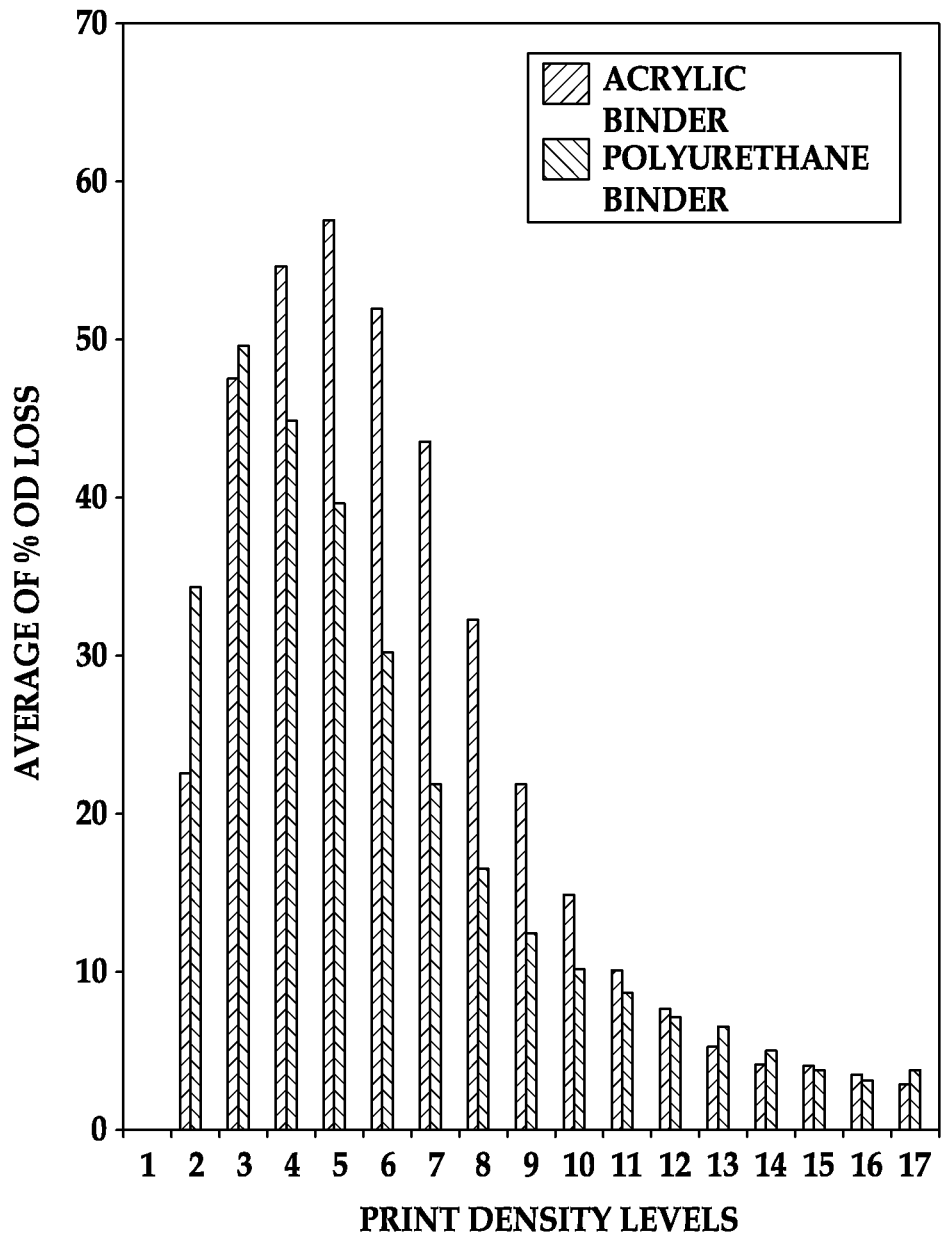
FIG. 4 is a bar graph which compares Optical Density loss of embodiments of two yellow inks respectively having therein an embodiment of the polyurethane binder disclosed herein and an acrylic binder at sixteen levels of increasing print density.

Similar tests that were performed as described in Example 2 above were also performed with two yellow inks. The results are shown in the bar graph labeled FIG. 4, which compares the optical density loss of each of the two inks at sixteen levels of increasing print density. The first ink has the conventional acrylic binder described hereinabove in Example 2. The second ink has the polyurethane binder described in the embodiments of the instant application. Each ink included approximately 1.5 weight % of its respective binder. The data consistently shows significantly less optical density loss for the ink with the polyurethane binder (the bar on the right for each print density level) as compared to the ink with the acrylic binder (the bar on the left for each print density level).

Example 6

The quality of an inkjet ink being able to recover normal printing characteristics after sitting idle in an inkjet nozzle for a given period of time is referred to as "decap". Decap testing was performed for several ink samples by allowing the printhead nozzles containing each given sample to sit idle for a given time, and then determining how many spits of the nozzles were necessary to recover normal printing characteristics. The more spits it took to recover, the worse the printhead performance is for a given ink at a given time. In general, decap values below 4 spits are considered good, up to 10 spits are acceptable, and above 10 spits are considered undesirable.

A magenta ink was made with 8% 1,3-di(hydroxyethyl)-5,5-dimethylhydantoin as a solvent and 1% polyurethane binder. The polyurethane binder had a molecular weight from 32 K to 50 K and an acid number from 40 to 45, and included polyether polyol, aliphatic isocyanate and an acid group, and did not include chain extenders. When decap was tested, this ink recovered after only 2 spits in 3.5 seconds, which is a very good result.

Example 7

Other inks were also tested with 8% 1,3-di(hydroxyethyl)-5,5-dimethylhydantoin and 1% of the same polyurethane binder described in Example 6. These inks included red ink, yellow ink (which used 6% of the polyurethane binder), light magenta, cyan, medium gray and photo black (pK). When decap was tested for each of these inks, similar results were obtained as were obtained from the magenta ink.

Example 8

A photo black ink was made similarly to the photo black ink described in Example 7, but with 2% of the polyurethane binder disclosed herein and with 10% betaine substituted for the 1,3-di(hydroxyethyl)-5,5-dimethylhydantoin. The ink was tested for decap as described in Example 6. Similar positive results were obtained.

Example 9

Table 1 shows exemplary ink formulations, which incorporate the novel aspects and advantages of the present disclosure. All amounts are in weight percent.

TABLE 1

| Components | light magenta | magenta | light cyan | photo black | medium grey | Red | Yellow |
|---|---|---|---|---|---|---|---|
| 1,3-di(hydroxyethyl)-5,5-dimethylhydantoin | 8.0 | 8.0 | 8.0 | 0.0 | 0.0 | 8.0 | 8.0 |
| Betaine | 0.0 | 0.0 | 0.0 | 10.0 | 10.0 | 0.0 | 0.0 |
| 1-(2-Hydroxyethyl)-2-pyrrolidone | 1.5 | 1.5 | 1.5 | 0.0 | 0.0 | 1.5 | 2.0 |
| Crodafos N3-Acid | 0.5 | 0.5 | 0.5 | 0.0 | 0.0 | 0.5 | 0.0 |
| Surfynol 440 | 0.5 | 0.5 | 0.5 | 0.2 | 0.2 | 0.5 | 0.2 |
| Fluorosurfactant | 0.1 | 0.1 | 0.1 | 0.1 | 0.1 | 0.1 | 0.1 |
| Proxel GXL | 0.2 | 0.2 | 0.2 | 0.2 | 0.2 | 0.1 | 0.1 |
| Triethanol Amine | 0.8 | 0.8 | 0.8 | 2.0 | 2.0 | 0.8 | 2.0 |
| Polyurethane binder | 2.0 | 1.0 | 1.0 | 2.0 | 2.0 | 1.0 | 1.5 |
| Alkane diol | 0.0 | 0.0 | 1.0 | 2.0 | 2.0 | 1.0 | 0.0 |
| Glycerol | 0.0 | 0.0 | 0.0 | 10.0 | 10.0 | 0.0 | 0.0 |
| Diethylene glycol | 0.0 | 0.0 | 0.0 | 0.0 | 1.0 | 0.0 | 6.5 |
| Pigment | 1.3 | 4.0 | 1.2 | 3.0 | 1.0 | 3.5 | 4.8 |
| Water | balance | balance | balance | balance | balance | balance | balance |

While several embodiments have been described in detail, it will be apparent to those skilled in the art that the disclosed embodiments may be modified. Therefore, the foregoing description is to be considered exemplary rather than limiting.

What is claimed is:

1. An inkjet ink composition, comprising:
    from 0.25 weight percent to 6 weight percent colorant;
    from 5 weight percent to 40 weight percent solvent;
    from 0.05 weight percent to 5 weight percent surfactant;
    polyurethane binder in an amount of at least 0.5 weight percent of the inkjet ink composition but not more than twice the weight percent of the colorant, the polyurethane binder formed from a polyether polyol, an aliphatic isocyanate, and an acid group; and
    a balance of water;
    wherein the polyurethane binder does not include chain extenders; and
    wherein the solvent includes a component solvent selected from the group consisting of 1,3-di(hydroxyethyl)-5,5-dimethylhydantoin, betaine, and combinations thereof.

2. The inkjet ink composition of claim 1 wherein the polyurethane binder is present in an amount of at least 0.75 weight percent of the inkjet ink composition but not more than twice the weight percent of the colorant.

3. The inkjet ink composition of claim 1 wherein the colorant is an acrylic resin-dispersed pigment.

4. The inkjet ink composition of claim 1 wherein the polyurethane binder has a glass transition temperature in a range of from 5° C. to 50° C.

5. The inkjet ink composition of claim 1 wherein the polyurethane binder has a number average molecular weight ranging from 32,000 to 50,000 and an acid number ranging from 40 mg-KOH/g composition to 45 mg-KOH/g composition.

6. The inkjet ink composition of claim 1 wherein the ink is a photo black ink, the solvent is betaine, and the ink composition includes 2 wt % of the polyurethane binder.

7. The inkjet ink composition as defined in claim 1 wherein the surfactant is selected from fluorosurfactants, polyethylene oxide alkyl ethers, polyethylene oxide alkyl esters, amine oxides, primary amine salts, secondary amine salts, tertiary amine salts, alkyne containing alcohols, alkyne containing glycols, and alkyl phenyl polyethylene oxides.

8. An ink set, comprising:
 at least one ink selected from the group consisting of black, cyan, magenta and yellow inks, wherein the at least one ink includes:
  from 0.25 weight percent to 6 weight percent colorant;
  from 7 weight percent to 40 weight percent solvent;
  from 0.05 weight percent to 5 weight percent surfactant;
  polyurethane binder in an amount of at least 0.5 weight percent of the at least one ink but not more than twice the weight percent of the colorant, the polyurethane binder formed from a polyether polyol, an aliphatic isocyanate, and an acid group; and
  a balance of water;
  wherein the polyurethane binder in the at least one ink has a number average molecular weight from 32,000 to 50,000 and an acid number from 40 mg-KOH/g composition to 45 mg-KOH/g composition;
  and wherein the polyurethane binder does not include chain extenders.

9. The ink set of claim 8 wherein the colorant in the at least one ink is an acrylic resin-dispersed pigment.

10. An ink set, comprising:
 at least one ink selected from the group consisting of black, cyan, magenta and yellow inks, wherein the at least one ink includes:
  from 0.25 weight percent to 6 weight percent colorant;
  from 7 weight percent to 40 weight percent solvent;
  from 0.05 weight percent to 5 weight percent surfactant;
  polyurethane binder in an amount of at least 0.5 weight percent of the at least one ink but not more than twice the weight percent of the colorant; and
  a balance of water;
  wherein:
   the polyurethane binder in the at least one ink has a number average molecular weight ranging from 32,000 to 50,000 and an acid number ranging from 40 mg-KOH/g composition to 45 mg-KOH/g composition;
   the polyurethane binder does not include chain extenders; and
   the polyurethane binder is prepared from polytetramethylene glycol and isophorone diisocyanate.

11. The ink set of claim 8 wherein the polyurethane binder in the at least one ink has a glass transition temperature in a range of from 5° C. to 50° C.

12. The ink set of claim 8 wherein the solvent includes a component solvent selected from the group consisting of 1,3-di(hydroxyethyl)-5,5-dimethylhydantoin, betaine, and combinations thereof.

13. A method of making an inkjet ink, comprising the steps of:
 combining a di-acid with polytetramethylene glycol to produce a diol;
 combining the diol with isophorone diisocyanate to produce a polyurethane binder; and
 combining the polyurethane binder with vehicle, colorant and surfactant to produce the inkjet ink;
 wherein the ink includes from 0.25 weight percent to 6 weight percent colorant; from 7 weight percent to 40 weight percent solvent; from 0.05 weight percent to 5 weight percent surfactant; and a balance of water;
 wherein the polyurethane binder is in an amount of at least 0.5 weight percent of the inkjet ink but not more than twice the weight percent of the colorant; and
 wherein the polyurethane binder does not include chain extenders.

14. The method of claim 13 wherein the colorant in the ink is an acrylic resin-dispersed pigment.

15. The method of claim 13 wherein the polyurethane binder in the ink has a glass transition temperature in a range from 5° C. to 50° C., with an average $T_g$ at approximately 27° C. as measured by DSC with a heating rate of 20° C./minute.

16. The method of claim 13 wherein the solvent includes a component solvent selected from the group consisting of 1,3-di(hydroxyethyl)-5,5-dimethylhydantoin, betaine, and combinations thereof.

17. An inkjet ink composition, comprising:
 from 0.25 weight percent to 6 weight percent colorant;
 from 5 weight percent to 40 weight percent solvent;
 from 0.05 weight percent to 5 weight percent surfactant;
 polyurethane binder in an amount of at least 0.5 weight percent of the inkjet ink composition but not more than twice the weight percent of the colorant, the polyurethane binder formed from a polyether polyol, an aliphatic isocyanate, and an acid group; and
 a balance of water;
 wherein the polyurethane binder does not include chain extenders; and
 wherein the polyether polyol is polytetramethylene glycol, the aliphatic isocyanate is isophorone diisocyanate, and the acid group is a di-acid.

* * * * *